Sept. 19, 1967 E. R. PHILLIPS 3,342,197
FLUID BINARY COUNTER
Filed May 12, 1964
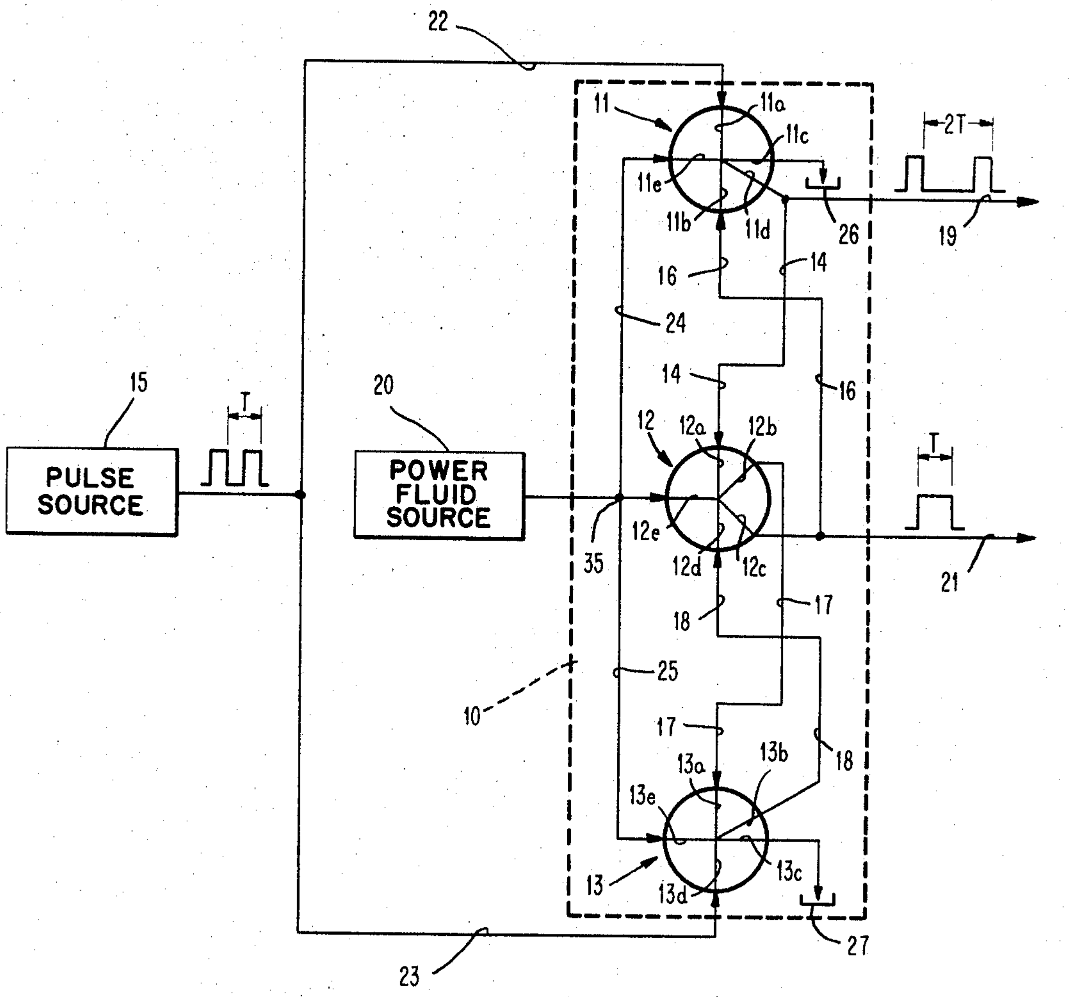
INVENTOR
EDWIN R. PHILLIPS
BY Thomas P. Murphy
AGENT 3,342,197

FLUID BINARY COUNTER

Edwin R. Phillips, Rosemont, Pa., assignor to Sperry Rand Corporation, New York, N.Y., a corporation of Delaware Filed May 12, 1964, Ser. No. 366,865
1 Claim. (Cl. 137—81.5)

This invention relates to a binary counter and more particularly to a pure fluid binary counter.

The advantages of the fluid devices referred to in the art generically as fluid amplifiers are many and well known. They are simple and inexpensive to construct. They utilize no moving parts other than the fluid itself and are therefore virtually trouble free in operation. No environmental limitation to their use in operation has yet been encountered, for example, they work well in conditions of extreme temperature variation, in high acceleration and vibration environments, as well as in radioactive environments.

The present invention contemplates a binary counter incorporating all of the above-mentioned advantages. In addition, the fluid binary counter of the present invention is an improvement over presently known fluid binary counters since it utilizes only a single flip-flop and two fluid mono-stable devices without necessity for any AND gates or OR gates. The fluid binary counter of the present invention provides well defined pulses at the stage output without the added requirement of a pulse forming stage. Furthermore, the operation of the binary counter of the present invention is not limited in any way by the time between applied pulses and can wait indefinitely for the next pulse. When the next pulse arrives the circuit will always be ready.

More particularly the present invention contemplates a fluid binary counter comprising a fluid flip-flop in novel combination with two fluid monostable multivibrators. One output channel of the fluid flip-flop is connected to a control channel of each of the fluid monostable multivibrators. Each of the astable output channels of the fluid monostable multivibrators is connected to a separate one of the control channels of the fluid flip-flop. A train of fluid pulses is applied simultaneously to the other control channels of the fluid monostable multivibrators but one of the fluid monostable multivibrators will be inhibited from switching to its astable state depending on the condition of the fluid flip-flop. The fluid flip-flop changes states for each applied pulse while one or both of the fluid monostable multi-vibrators may be connected to provide one output pulse for every other one of the applied pulses.

Therefore, it is an object of the present invention to provide a fluid binary counter employing fluid devices.

It is another object of the present invention to provide a fluid binary counter providing an output of well defined output pulses without necessity for passing the pulses through a pulse forming stage.

A further object of the present invention is to provide a fluid binary counter which employs only three fluid devices which is simple and inexpensive to construct, trouble free in operation and capable of operation in virtually all existing environments.

It is another object of the present invention to provide a fluid binary counter which is not limited by the time between pulses and which may be constructed to handle pulses of any desirable maximum duration without malfunction such as double pulsing.

Other objects of the present invention will become more apparent upon the reading of the description in conjunction with the accompanying drawing wherein the figure illustrates in schematic form a preferred embodiment of the present invention.

Referring now more particularly to the figure there is shown the fluid binary counter 10 of the present invention. The fluid binary counter 10 comprises a fluid bi-stable multi-vibrator or flip-flop 12 and two mono-stable multi-vibrators 11 and 13. The flip-flop 12 shown here in schematic form is of a type similar to that described in the literature and in patents such as United States Patents 3,001,698 and 3,016,066.

The flip-flop 12 comprises a power fluid input channel **12*e*, output channels 12*b* and 12*c*, and control channels 12*a* and 12*d*** arranged as shown.

The flip-flop 12 is so constructed that when power fluid is applied to the channel **12*e* and emerging from the output channel 12*b* as a power stream, a fluid control pulse applied to the channel 12*a* causes the power stream to switch from the channel 12*b* to the channel 12*c*. Due to the bi-stable nature of the flip-flop 12 the power stream remains switched to the output channel 12*c* after the control pulse has terminated. However, when a control fluid pulse is applied to the control input channel 12*d*, the power stream switches to the output channel 12*b***.

Mono-stable multi-vibrator 11 is of a type similar to that described in the literature and is similar to the flip-flop 12 except that it lacks the well known lock on feature of a fluid flip-flop. It comprises a power input channel **11*e*, output channels 11*c* and 11*d*, and control channels 11*a* and 11*b* all interconnected as shown. The mono-stable multi-vibrator 11 is so constructed that when the power fluid is applied to the power input channel 11*e* no control pulse is applied to the control channel 11*a*, the fluid emerges as a power stream from the output channel 11*c* whence it returns to the power fluid source 20 via reservoir 26**. This is its stable state.

When a control pulse is applied to the control input **11*a*, the power stream is deflected to the output channel 11*d* for the duration of the pulse. This is the astable state. Due to the mono-stable nature of the multi-vibrator 11, the fluid reverts to the output channel 11*c* on cessation of the control pulse. If, however, when a control pulse is applied to the control input 11*a* there is control fluid being applied at the control input 11*b*, the power stream will fail to switch from the output channel 11*c* to the output channel 11*d*** and is therefore said to be inhibited.

The mono-stable multi-vibrator 13 comprises a power input channel **13*e*, output channels 13*b* and 13*c*, and control channels 13*a* and 13*d* all interconnected as shown. The output channel 13*c* is connected to reservoir 27 whence it returns to the fluid power source 20. The mono-stable multi-vibrator 13 is identical in structure and function to the mono-stable multi-vibrator 11**.

The power fluid source 20 is connected to the power input channels **11*e*, 12*e* and 13*e* of fluid mono-stable multi-vibrator 11, flip-flop 12 and mono-stable multi-vibrator 13, respectively, via conduits 24, 35 and 25. The pulse source 15 is connected to the control input channels 11*a* and 13*d* of fluid mono-stable multi-vibrators 11 and 13 via conduits 22 and 23**, respectively.

The output channel **12*b* of the flip-flop 12 is connected to the control channel 13*a* of the mono-stable multi-vibrator 13 by means of a conduit 17. Similarly, the output channel 12*c* of the flip-flop 12 is connected to the control channel 11*b* of the mono-stable multi-vibrator 11 via a conduit 16. The output channel 12*c* of the flip-flop 12 also is connected to a conduit 21 for providing an output pulse having a duration equal to the time interval between pulses from the pulse source as will be more fully explained hereinafter. The output channel 11*d* of the mono-stable multi-vibrator 11 is connected to the control input 12*a* of the flip-flop 12 via a conduit 19 which provides an output train of pulses having a frequency equal to one half the frequency of the pulses provided by the pulse source 15. The duration of each of these pulses is substantially equal to the duration of the input pulses. The conduit 19 may be connected to the next binary stage not shown. The output channel 13***b* of the mono-stable multi-vibrator 13 is connected to the control channel 12*d* of the flip-flop 12 via a conduit 18.

In operation the pulse source 15 provides a pulse train having a period T, which is to be counter by the binary counter 10. The pulse train is applied to the mono-stable multi-vibrators 11 and 13 over the conduits 22 and 23 with individual pulses arriving simultaneously at the control channels 11*a* and 13*d*. One of the mono-stable multi-vibrators 11 or 13 will be switched to cause the power stream to pass out of output channels 11*d* or 13*b*. The particular one of multi-vibrator 11 and 13 that is switched depends on the state of the flip-flop 12 prior to the simultaneous application of a pulse to the control channels 11*a* or 13*d*. If prior to the introduction of a pulse at the control channels 11*a* or 13*d*, the flip-flop 12 is in the ON condition, that is, the power stream is in the output channel 12*c*, the input pulse at the control channel 11*a* will not change the condition of the mono-stable multi-vibrator 11 because of the inhibiting signal applied to the control input 11*b* over conduit 16.

However, the pulse applied to the control input 13*d* of the multi-vibrator 13 does switch the power stream from the output channel 13*c* to the output channel 13*b* since the control channel 13*a* has no inhibiting signal applied thereto. When the power stream is switched from the output channel 13*c* to the output channel 13*b*, a pulse is applied to the control channel 12*d* of the flip-flop 12 through the conduit 18 thereby switching the power stream from the output channel 12*c* to the output channel 12*b*. This simultaneously removes the inhibiting pulse from the control channel 11*b* and applies an inhibiting signal to the control channel 13*a* via the conduit 17.

Thus, the next pulse from the pulse source 15 which is applied simultaneously to the control channels 11*a* and 13*d* causes the power stream to switch from the output channel 11*c* to the output channel 11*d* of the mono-stable multi-vibrator 11 thereby providing an output pulse in the conduit 19. The pulse which is applied to the control channel 13*d* fails to change the state of the mono-stable multi-vibrator 13 because of the inhibiting signal being applied at the control channel 13*a* from the output channel 12*b* of the flip-flop 12 over the conduit 17. At the same time the state of the flip-flop 12 is changed in response to the output from the output channel 11*d* applied to the control channel 12*a* over the conduit 14. This cycle is repeated for each two pulses from the pulse source 15 and for each two pulses provided by the pulse source 15 the mono-stable multi-vibrator 11 provides the conduit 19 with a single output pulse. At the same time the conduit 21 provides an output pulse equal in duration to the period of the pulse train provided by the pulse source 15.

Thus, the flip-flop 12 changes state for each input pulse. The input signal to the next stage, however, occurs only for every other input pulse.

The minimum duration of the input pulses from the pulse source 15 is determined by the time it takes to change the state of the mono-stable multi-vibrators 11 or 13. The maximum duration is determined by the lengths of the conduits 16 and 17. For any particular maximum duration of the input pulses, lengths for conduits 16 and 17 providing the necessary delays may be selected to prevent any possibility of double pulsing.

The embodiments of the invention in which an exclusive property or privilege is claimed are defined as follows:

In a fluid binary counter, a fluid flip-flop having an input channel, first and second control channels, and first and second output channels, a fluid power source connected to said input channel, a source of fluid pulses, means connected between said source of fluid pulses and said first and second control channels applying a switching pulse to said first control channel in response to even numbered ones of said fluid pulses, said means including, a fluid mono-stable multi-vibrator having its input channel connected to said source of power fluid and its astable output channel connected to said first control channel of said fluid flip-flop, first conductor means connecting one of said output channels of said fluid flip-flop to one of the control channels of said fluid mono-stable multi-vibrator for preventing the power stream of said fluid mono-stable multi-vibrator from switching said astable output channel when the power stream of said fluid flip-flop is in said one of said output channels, second conductor means connecting the other of said control channels of said fluid mono-stable multi-vibrator to said source of fluid pulses for switching the power stream of said fluid mono-stable multi-vibrator to said astable output channel whereby each time said fluid mono-stable multi-vibrator is so switched the power stream of said fluid flip-flop is switched to said one of said output channels of said fluid flip-flop.

References Cited

UNITED STATES PATENTS

| | | | |
|---|---|---|---|
| 3,001,698 | 9/1961 | Warren | 137—81.5 X |
| 3,016,066 | 1/1962 | Warren | 137—81.5 |
| 3,128,039 | 4/1964 | Norwood | 137—81.5 X |
| 3,199,782 | 8/1965 | Shinn | 137—81.5 X |
| 3,221,990 | 12/1965 | Warren | 235—201 |
| 3,227,368 | 1/1966 | Jacoby | 235—201 |
| 3,232,305 | 2/1966 | Groeber | 137—81.5 |

M. CARY NELSON, *Primary Examiner.*

S. SCOTT, *Assistant Examiner.*